United States Patent [19]

Kania et al.

[11] Patent Number: 4,618,659

[45] Date of Patent: Oct. 21, 1986

[54] LOW MOLECULAR WEIGHT ACRYLIC POLYMERS

[75] Inventors: Charles M. Kania, Tarentum; Rostyslaw Dowbenko, Gibsonia, both of Pa.

[73] Assignee: PPG Industries, Inc., Pittsburgh, Pa.

[21] Appl. No.: 678,435

[22] Filed: Dec. 5, 1984

[51] Int. Cl.$^4$ ............................................. C08F 283/04
[52] U.S. Cl. .................................. 525/455; 525/445; 525/170; 524/384; 526/201
[58] Field of Search .................. 525/445, 455, 170; 524/384; 526/201

[56] References Cited

U.S. PATENT DOCUMENTS

| | | | |
|---|---|---|---|
| 4,075,242 | 2/1978 | Rhum et al. | 560/190 |
| 4,276,212 | 6/1981 | Khanna et al. | 260/32.8 |
| 4,317,894 | 3/1982 | Lewarchik et al. | 525/455 |
| 4,351,928 | 9/1982 | Smith | 525/443 |
| 4,361,676 | 11/1982 | Simpson | 525/118 |
| 4,414,370 | 11/1983 | Hamielec et al. | 526/88 |

FOREIGN PATENT DOCUMENTS

| | | |
|---|---|---|
| 052233A1 | 10/1981 | European Pat. Off. |
| 2703311 | 1/1977 | Fed. Rep. of Germany |
| WO82/02387 | 7/1982 | PCT Int'l Appl. |
| 1029544 | 3/1963 | United Kingdom |
| 1107249 | 8/1965 | United Kingdom |
| 1515868 | 6/1978 | United Kingdom |

OTHER PUBLICATIONS

Acrylic Copolymer Oligomers for High Solids Coating Resins by David Rhum & Patrick Aluotto, Journal of Coatings Technology, vol. 55, No. 703, Aug. 1983, published by Federation of Societies for Coatings Techn. Phil., PA.

D. Bauer and G. Budde, "Crosslinking Chemistry and Network Structure in Organic Coatings, III, Single Component High Solids Acrylics," Organic Coatings & Plastic Chemicals, vol. 43, pp. 59–64 by Ame. Chem. Soc., Wash., DC.

Primary Examiner—John Kight
Assistant Examiner—M. L. Moore
Attorney, Agent, or Firm—Linda Pingitore

[57] ABSTRACT

An ungelled polymeric reaction product having a number average molecular weight of up to about 3000 and having a polydispersity of within 1.2 to 2.5 is prepared by a process involving the vinyl addition polymerization of a vinyl monomer component. At least 30 percent by weight of the vinyl monomer component is an active hydrogen-containing vinyl monomer, and the polymerization is conducted in the presence of an active hydrogen-containing polymer having a number average molecular weight of less than 3000.

23 Claims, No Drawings

LOW MOLECULAR WEIGHT ACRYLIC POLYMERS

BACKGROUND OF THE INVENTION

The present invention relates to low molecular weight acrylic polymers.

The preparation of low molecular weight acrylic polymers for use in formulating low volatile organic content (VOC) compositions has become increasingly important. It has been found, however, that decreased molecular weight, in and of itself, is not a total solution because film properties such as hardness and durability are generally detrimentally affected as the molecular weight of the polymer decreases. This phenomenon has been explained on the basis of deficient functionality. That is, that low molecular weight polymers with fewer than two functional groups cannot contribute to a crosslinking network and thus tend to give poor film properties.

The art has attempted to address these difficulties in a number of ways, for example, U.S. Pat. No. 4,075,242 which discloses a polymerization process conducted at temperatures in excess of about 150° C. and in the presence of a high boiling solvent as a polymerization medium, the preferred being benzyl alcohol. Often, however, it is desirable to prepare an acrylic based coating composition which has modified properties, but yet, still has a low VOC. There is a need for such a method of preparation and the resultant products.

SUMMARY OF THE INVENTION

In accordance with the present invention there is provided an ungelled polymeric reaction product having a number average molecular weight of up to about 3000 and having a polydispersity of within 1.2 to 2.5 prepared by a process comprising the vinyl addition polymerization of a vinyl monomer component of which at least 30 percent by weight is an active hydrogen-containing vinyl monomer in the presence of an active hydrogen-containing polymer having a number average molecular weight of less than 3000. There is also provided a process of vinyl addition polymerization and coating compositions prepared with the ungelled polymeric reaction product.

DETAILED DESCRIPTION OF THE INVENTION

The polymeric reaction product of the present invention has a number average molecular weight of up to about 3000, preferably up to 2000 and a polydispersity of within 1.2 to 2.5. The reaction product is preferably substantially free of polymeric species that do not contain active hydrogen functionality. By this is meant that at least 80 percent of the polymeric reaction product which is formed contains active hydrogen functionality. Active hydrogen functionality for the purposes of this application includes hydroxyl, amino, thiol, amide, methylolamide, carboxyl, and sulfonic acid.

The reaction product is ungelled and usually liquid. By this is meant that the product is fluid in nature and is substantially free of gelled polymeric particles. The polydispersity of the polymeric reaction product is equal to the weight average molecular weight divided by the number average molecular weight.

The ungelled polymeric reaction product is prepared by a process which comprises the vinyl addition polymerization of a vinyl monomer component of which at least 30 percent by weight is an active hydrogen-containing vinyl monomer. Preferably at least 75 percent by weight of the vinyl monomer component is an active hydrogen-containing vinyl monomer. Suitable functional monomers include 2-hydroxyethyl acrylate, 2-hydroxyethyl methacrylate, 2-hydroxypropyl acrylate, 2-hydroxypropyl methacrylate, 2-hydroxybutyl methacrylate, the reaction product of an epoxy functional acrylate or methacrylate such as glycidyl acrylate or glycidyl methacrylate with a carboxylic acid such as acetic acid or a mineral acid such as sulfuric acid; methacrylic acid; acrylic acid; acrylamide; an N-methylolacrylamide such as the reaction product of acrylamide with formaldehyde; N-butoxymethyl acrylamide; tertiarybutylaminoethyl methacrylate; and sulfoethyl methacrylate.

Preferably 2-hydroxypropyl acrylate or methacrylate or 2-hydroxyethyl acrylate or methacrylate are utilized. The balance of the vinyl monomer component can include a variety of other monomers which contain polymerizable vinyl unsaturation. For example, alkyl acrylates and methacrylates which contain from 1 to 18 carbon atoms, preferably 1 to 6 carbon atoms in the alkyl portion such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, 2-ethylhexyl methacrylate, lauryl (meth)acrylate, stearyl (meth)acrylate, isodecyl (meth)acrylate and isobornyl (meth)acrylate. Also useful are styrene, para-methyl styrene, and alpha-methyl styrene. Mixtures of the aforesaid monomers can also be utilized if desired.

The molecular weights of the ungelled polymeric reaction products of the present invention are determined by gel permeation chromatography using a polystyrene standard. Therefore, it is not the actual molecular weight which is measured but an indication of the molecular weight as compared to polystyrene. The values which are obtained are commonly referred to as polystyrene numbers; however, for the purposes of this application they are referred to as molecular weights.

In measuring the number average molecular weight using polystyrene as the standard, a Waters Associates gel permeation chromatograph Model 201 was used. Six micro-Styragel columns were used. Each column measured 30 centimeters in length and had an inside diameter of 7.8 millimeters. A differential refractometer was used as detector, and the columns were arranged according to their pore size on the order of $10^3$, $10^4$, $10^5$, $10^6$, 500, 100 Angstroms with the $10^3$ Angstrom column being the first one. Tetrahydrofuran was used as a solvent with a flow rate of 2.0 milliliters/minute. The quality of the columns is checked by their "theoretical plate number" determined from orthodichlorobenzene. For the purposes of this application, those columns with theoretical plate numbers greater than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, Pa. The polystyrene standards have dispersities (dispersity=weight average molecular weight/number average molecular weight) ranging from 1.05 to 1.10. The viscosity average molecular weights of the polystyrene standards used were 850,000; 233,000; 47,400; 17,400 and 3,600. To obtain a calibration curve, a set of 0.1 percent (10 milligram polystyrene/1.0 ml tetrahydrofuran) polystyrene solutions in tetrahydrofuran were prepared, and a 0.5 ml sample size was injected into the columns and a GPC chromatogram was obtained. The elution volume of each peak corresponding to a given molecular weight of the polystyrene standard was measured, and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 3,600, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations, the following averages are calculated: Number average molecular weight = $\Sigma H / \Sigma H/M$. This is the number reported.

The vinyl addition polymerization of the claimed invention is conducted in the presence of an active hydrogen-containing polymer having a number average molecular weight of less than 3000. Suitable polymers include polyester polyols, poly(ester-urethane) polyols, polyepoxides, and polyester-polyepoxides.

Polyester polyols, which can be used as the polyol component of the invention, can be prepared by the polyesterification of an organic polycarboxylic acid or anhydride thereof with organic polyols and/or an epoxide. Usually, the polycarboxylic acids and polyols are aliphatic or aromatic dibasic acids or acid anhydrides and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols. An example of such a higher molecular weight polyol is the reaction product of 20 moles of ethylene oxide per mole of trimethylolpropane. Some monofunctional alcohols such as normal propyl alcohol and normal butyl alcohol can be used in the polyesterification.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, and other dicarboxylic acids of varying types. The polyester may include minor amounts of monobasic acids such as benzoic acid, stearic acid, acetic acid and oleic acid. Also, there may be employed higher polycarboxylic acids such as trimellitic acid and tricarpolycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol.

The poly(ester-urethane) polyols are formed by reacting an organic polyisocyanate with a polyester polyol as described above. The organic polyisocyanate is reacted with the polyol so that the OH/NCO equivalent ratio is greater than 1:1 so that the resultant product contains free hydroxyl groups. The organic polyisocyanate which is used in preparing the polyurethane polyols can be an aliphatic or an aromatic polyisocyanate or a mixture of the two. Aliphatic polyisocyanates (including cycloaliphatic polyisocyanates) are preferred. Also, diisocyanates are preferred, although higher polyisocyanates such as triisocyanates can be used. However, their use does result in some chain branching which results in increased viscosity and difficulties in formulating the coating compositions of the invention.

Examples of suitable diisocyanates are 4,4'-diphenylmethane diisocyanate, 1,4-tetramethylene diisocyanate, isophorone diisocyanate and 4,4'-methylene-bis-(cyclohexyl isocyanate). Examples of suitable higher functionality polyisocyanates are polymethylene polyphenyl isocyanates.

The epoxide resins are those compounds having a 1,2 epoxide group present in the molecule. Hydroxyl groups may also be present and often are. Polyepoxides contain more than one 1,2-epoxy group per molecule. In general, the epoxide equivalent weight will range from about 140 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, tetephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenolformaldehyde condensate.

Also useful are materials produced by chain extending a carboxyl functional polyester with an epoxy-containing material.

The epoxy resins can be defunctionalized by carboxylic acids, alcohol, water, phenols, mercaptans or other active hydrogen-containing compounds to give hydroxyl-containing polymers.

Preferably a polyester polyol is utilized having a hydroxyl number within the range of 80 to 350 and typically an acid value within the range of 1 to 10.

The vinyl addition polymerization reaction is usually conducted at a temperature within the range of 150° C. to 250° C., preferably 170° C. to 210° C. There is generally present a free radical initiator which is typically selected from peroxides and hydroperoxides. Examples of these types of initiators include di-tertiarybutyl peroxide, di-cumylperoxide; cumenehydroperoxide; 2,5 dimethyl-2,5-bis(tertiarybutylperoxy) hexane; hexyne-3-tertiarybutyl cumylperoxide; tertiaryamyl peroxide; 2,5-dihydroperoxy 2,5-dimethyl hexane.

The initiator is usually present in an amount ranging from 0.10 percent to 10 percent, the percentage based on the weight of the vinyl monomer component. In one preferred embodiment, there is additionally present during the vinyl addition polymerization a solvent having a boiling point of at least 150° C. The solvent assists in maintaining the preferred reaction temperature. Examples of these solvents include methyl amyl ketone, benzyl alcohol, methyl benzyl alcohol, diisopropyl benzene, cumyl alcohol and isopropyl benzene. Preferably, benzyl alcohol is utilized.

The ungelled polymeric reaction products of the present invention are useful as film-forming vehicles in the preparation of coating compositions such as, for example, clear coating compositions useful in automotive applications. The resultant coating compositions have low volatile organic content, generally to a maximum of 3.50 pounds/gallon, preferably up to 3.1 pounds/gallon, and the cured film exhibits good hardness. It has been observed that the VOCs of the reaction products of the present invention which are prepared in the presence of a polymer having active hydrogen functionality are lower than VOCs obtained if the vinyl monomer component is polymerized and the resultant polymer blended with the polymer having active hydrogen functionality. The active hydrogen-functional polymeric reaction products are usually utilized in conjunction with curing agents which are capable of reacting with the active hydrogens on the polymeric product. Examples of suitable curing agents are aminoplast and isocyanate curing agents, including blocked polyisocyanates.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or triazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-traizine, 3,5-diaminotriazole, triaminopyrimidine, 2,6-triethyltriamine-1,3,5-triazine and the like.

While the aldehyde employed is most often formaldehyde, other aldehydes such as acetyladehyde, crotonaldehyde, benzaldehyde and furfural may be used.

The aminoplast contains methylol or similar alkylol groups are preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine, urea-or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester of polyether polyols. Particularly useful isocyanates are the isocyanate from isophorone isocyanate commercially available from Veba Company as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

The following examples are illustrative of the invention and are not meant to limit it to their details.

EXAMPLE I

Example I as well as Examples II and III which follow were prepared from 75 percent of a polyester polyol component and 25 percent of a vinyl monomer component.

| | Parts by Weight (grams) |
|---|---|
| Charge A | |
| hydroxyl-functional polyester[1] | 1232 |
| benzyl alcohol | 154 |
| Charge B | |
| 2-hydroxyethyl methacrylate | 308 |
| benzyl alcohol | 154 |
| Charge C | |
| benzyl alcohol | 140 |
| di-tertiarybutyl peroxide | 15.4 |
| Charge D | |
| di-tertiarybutyl peroxide | 1.232 |
| Charge E | |
| di-tertiarybutyl peroxide | 1.232 |

[1] This polyester polyol was prepared from neopentyl glycol and hexahydrophthalic anhydride at a molar ratio of 2 to 1 and had a hydroxyl value of 312 and acid number of 4.

A reactor vessel was charged with A and heated to 200° C. Subsequently, while maintaining the temperature at 190° C. to 200° C., charges B and C were added continuously over a period of 4 hours; charge B at a rate of 28 milliliters per 15-minute period; charge C at a rate of 10 milliliters per 15-minute period. Charge D was then added, and after the addition of D was complete, the reaction mixture was maintained at reflux for one hour, then charge E was added, and the reaction mixture held at reflux for one and one-half hours. The resultant reaction product had a number average molecular weight of 398 (as determined by GPC using a polystyrene standard) and a polydispersity of 1.48. The benzyl alcohol was removed by vacuum distillation to give a product having an actual total solids content of 93.8 percent with a Gardner-Bubble viscosity of $Z^{7-8}$.

EXAMPLE II

| | Parts by Weight (grams) |
|---|---|
| Charge A | |
| hydroxyl-functional polyester[2] | 825 |
| benzyl alcohol | 110 |
| Charge B | |
| hydroxypropyl acrylate | 110 |
| styrene | 55 |
| butyl acrylate | 55 |
| butyl methacrylate | 55 |
| benzyl alcohol | 110 |
| Charge C | |
| benzyl alcohol | 100 |
| di-tertiarybutyl peroxide | 13.75 |
| Charge D | |
| di-tertiarybutyl peroxide | 1.10 |
| Charge E | |
| di-tertiarybutyl peroxide | 1.10 |

[2] This polyester polyol is described in footnote 1, above.

A reactor vessel was charged with A and heated to reflux. Subsequently, while maintaining the temperature at reflux, charges B and C were added continuously over a period of 4 hours; charge B at a rate of 26 milliliters per 15-minute period; charge C at a rate of 7 milliliters per 15-minute period. Charge D was then added, and after the addition of D was complete, the reaction mixture was maintained at the reaction temperature for one hour; then charge E was added, and the reaction mixture held at temperature for one and one-half hours. The resultant reaction product had a Gardner viscosity of W at 70 percent total solids, a number average molecular weight of 454 as determined by GPC using a polystyrene standard and a polydispersity of 1.67.

EXAMPLE III

| | Parts by Weight |
|---|---|
| Charge A | |
| polyester-urethane[3] | 880 |
| benzyl alcohol | 110 |
| Charge B | |
| 2-hydroxyethyl methacrylate | 165 |
| butyl acrylate | 55 |
| benzyl alcohol | 110 |
| Charge C | |
| benzyl alcohol | 100 |
| di-tertiarybutyl peroxide | 13.75 |
| Charge D | |
| di-tertiarybutyl peroxide | 1.10 |
| Charge E | |
| di-tertiarybutyl peroxide | 1.10 |

[3] The polyester urethane was prepared by chain extension of the aforesaid polyester using 1.6-hexanediol and trimethylene hexamethylenediisocyanate. The polyester urethane was prepared from 50 weight percent of the polyester, 25 weight percent each of the diol and diisocyanate. The hydroxyl number at 100 percent total solids was 101.

A reactor vessel was charged with A and heated to a temperature of 200° C. Subsequently, while maintaining the temperature at 189° C. to 200° C., charges B and C were added continuously over a period of 4 hours; charge B at a rate of 20 milliliters per 15-minute period; charge C at a rate of 7 milliliters per 15-minute period. Charge D was then added, and after the addition of D was complete, the reaction mixture was maintained at the reaction temperature for one hour; then Charge E was added, and the reaction mixture held at temperature for one and one-half hours. The resultant reaction product had a Gardner viscosity of Z2 at 75 percent total solids, a number average molecular weight of 673 as determined by GPC using a polystyrene standard and a polydispersity of 1.96.

Examples IV, V and VI which follow were prepared with 60 percent polyester/40 percent vinyl monomer, 50 percent polyester/50 percent vinyl monomer, and 40 percent polyester/60 percent vinyl monomer, respectively.

EXAMPLE IV

| | Parts by Weight (grams) |
|---|---|
| Charge A | |
| hydroxyl functional polyester[4] | 660 |
| benzyl alcohol | 110 |
| Charge B | |
| 2-hydroxyethyl methacrylate | 440 |
| benzyl alcohol | 110 |
| Charge C | |
| benzyl alcohol | 100 |
| di-tertiarybutyl peroxide | 22 |
| Charge D | |
| di-tertiarybutyl peroxide | 1.76 |
| Charge E | |
| di-tertiarybutyl peroxide | 1.76 |

[4] As described in footnote 1, above.

This Example was conducted just as Example I, above, with the exception that charge B was added at a rate of 33 milliliters per 15 minute period and charge C was added at a rate of 7.8 milliliters per 15 minute period. 431.5 grams of solvent was removed by distillation to yield a product having a Gardner viscosity of X at 79 percent total solids. The resultant reaction product had a number average molecular weight of 400 (as determined by GPC using a polystyrene standard) and a polydispersity of 1.63.

EXAMPLE V

| | Parts by Weight |
|---|---|
| Charge A | |
| hydroxyl functional polyester[5] | 550 |
| benzyl alcohol | 110 |
| Charge B | |
| 2-hydroxyethyl methacrylate | 550 |
| benzyl alcohol | 110 |
| Charge C | |
| benzyl alcohol | 100 |
| di-tertiarybutyl peroxide | 27.5 |
| Charge D | |
| di-tertiarybutyl peroxide | 2.2 |
| Charge E | |
| di-tertiarybutyl peroxide | 2.2 |

[5] As described in Example 1, above.

This Example was conducted just as Example I, above, with the exception that charge B was added at a rate of 38 milliliters per 15 minute period and charge C was added at a rate of 8 milliliters per 15 minute period. 320 grams of solvent were removed by vacuum distillation to yield a product having a Gardner viscosity of $Z^1$ at a total solids content of 79.8 percent. The resultant reaction product had number average molecular weight of 437 (as determined by GPC using polystyrene standard) and a polydispersity of 1.73.

EXAMPLE VI

| | Parts by Weight (grams) |
|---|---|
| Charge A | |
| hydroxyl functional polyester[6] | 440 |
| benzyl alcohol | 110 |
| Charge B | |
| 2-hydroxyethyl methacrylate | 660 |
| benzyl alcohol | 110 |
| Charge C | |
| benzyl alcohol | 100 |
| di-tertiarybutyl peroxide | 33 |
| Charge D | |
| di-tertiarybutyl peroxide | 2.64 |
| Charge E | |
| di-tertiarybutyl peroxide | 2.64 |

[6] As described in footnote 1, above.

This Example was conducted just as Example I, above with the exception that charge B was added at a rate of 44 milliliters per 15 minute period and charge C was added at rate of 8.2 milliliters per 15 minute period. 411.9 grams of solvent were removed by vacuum distillation to yield a product having a Gardner viscosity of $Z^4$ at a total solids of 79.2 percent. The resultant product had a number average molecular weight of 464 (as determined by GPC using a polystyrene standard) and a polydispersity of 1.90.

COATING EXAMPLES 1 TO 12

The reaction products prepared in the above Examples were formulated into clear coating compositions utilizing 30 percent (Group A), 50 percent (Group B) and 70 percent (Group C) levels of a melamine-formaldehyde crosslinking agent. The ingredients and respective amounts are detailed in Table I, below.

The clear coating compositions were prepared by combining the ingredients together with agitation. The volatile organic content of each of the coating compositions was determined according to ASTM D-3960 and is set out in Table II, below. The method involves weighing a sample of coating composition, heating it for one hour at 110° C. and then weighing it again. The residue includes resins, pigments, and any other component not volatilized at the test temperature.

The compositions were spray applied onto metal panels which had been coated twice with a pigmented polyester-based coating composition commercially available from PPG Industries, Inc., as UBC. Each basecoat coat was flashed for 1.5 minutes at room temperature. The clear compositions were also applied in two coats with a 1.5 minute flash at room temperature between coats. After the second coat was applied, it was flashed for 5 mintues at room temperature and then baked for 30 minutes at 250° F. (121° C.). The films were evaluated for Tukon hardness. Tukon hardness is determined by the microscopic examination of the size of an indentation made by a diamond indentor using a 20X objective lens and a 25 gram load. A Filar units scale ranging from 300 to 479 is used to convert from Filar units to Knoop hardness referred to here as Tukon hardness. The results are also set out below in Table II.

TABLE I

| | Parts by Weight (grams) | | | | | | | | | | | |
|---|---|---|---|---|---|---|---|---|---|---|---|---|
| | Group A Example | | | | Group B Example | | | | Group C Example | | | |
| Ingredients | 1 | 2 | 3 | 4 | 5 | 6 | 7 | 8 | 9 | 10 | 11 | 12 |
| polymeric reaction product of: | | | | | | | | | | | | |
| EX I | 74.6 | | | | 53.3 | | | | 32.1 | | | |
| EX IV | | 88.6 | | | | 63.2 | | | | 38.0 | | |
| EX V | | | 87.7 | | | | 62.6 | | | | 37.6 | |
| EX VI | | | | 88.4 | | | | 63.2 | | | | 37.9 |
| CYMEL 1130[a] | 30 | 30 | 30 | 30 | 50 | 50 | 50 | 50 | 70 | 70 | 70 | 70 |
| TINUVIN 328[b] | 3 | 3 | 3 | 3 | 3 | 3 | 3 | 3 | 3 | 3 | 3 | 3 |
| Rheology modifier[c] | 4.5 | 4.5 | 4.5 | 4.5 | 4.5 | 4.5 | 4.5 | 4.5 | 4.5 | 4.5 | 4.5 | 4.5 |
| Polymeric, flow and crater additive | 0.39 | 0.39 | 0.39 | 0.39 | 0.39 | 0.39 | 0.39 | 0.39 | 0.39 | 0.39 | 0.39 | 0.39 |
| methanol | 6 | 6 | 6 | 6 | 6 | 6 | 6 | 6 | 6 | 6 | 6 | 6 |

TABLE I-continued

| | Parts by Weight (grams) | | | | | | | | | | | |
|---|---|---|---|---|---|---|---|---|---|---|---|---|
| | Group A Example | | | | Group B Example | | | | Group C Example | | | |
| Ingredients | 1 | 2 | 3 | 4 | 5 | 6 | 7 | 8 | 9 | 10 | 11 | 12 |
| catalyst solution[e] | 2.5 | 2.5 | 2.5 | 2.5 | 2.5 | 2.5 | 2.5 | 2.5 | 2.5 | 2.5 | 2.5 | 2.5 | methyl amyl ketone added to achieve a sprayable solids content of 70 percent by weight.
[a] A methylated, butylated melamine-formaldehyde crosslinking agent which is commercially available from American Cyanamid.
[b] A hindered amine ultraviolet light absorber which is commercially available from Ciba-Geigy.
[c] As described in U.S. Pat. No. 4,147,688, Example II.
[d] Polybutylacrylate.
[e] A 30 percent solution in isopropanol of amine blocked dinonylnaphthalene disulfonic acid.

TABLE II

| Coating Composition | VOC | Tukon Hardness |
|---|---|---|
| Group A: 30% crosslinking agent | | |
| 1 | 3.10 | 10.1 |
| 2 | 3.94 | 15.05 |
| 3 | 3.74 | 14.15 |
| 4 | 3.95 | 14.75 |
| Group B: 50% crosslinking agent | | |
| 5 | 2.90 | 3.65 |
| 6 | 3.58 | 13.20 |
| 7 | 3.62 | 13.90 |
| 8 | 3.78 | 13.40 |
| Group C: 70% crosslinking agent | | |
| 9 | 2.78 | <2 |
| 10 | 3.38 | 10.75 |
| 11 | 3.44 | 12.25 |
| 12 | 3.61 | 13.05 |

What is claimed is:

1. An ungelled polymeric reaction product having a number average molecular weight of up to about 3000 and having a polydispersity of within 1.2 to 2.5 prepared by a process, comprising the vinyl addition polymerization of a vinyl monomer component of which at least 30 percent by weight is an active hydrogen-containing vinyl monomer, in the presence of an active hydrogen-containing polymer having a number average molecular weight of less than 3000.

2. The ungelled polymeric reaction product of claim 1 having a number average molecular weight of up to about 2000.

3. The ungelled polymeric reaction product of claim 2 having a volatile organic content of up to 3.50 pounds per gallon.

4. The ungelled polymeric reaction product of claim 1 wherein at least 75 percent by weight of the vinyl monomer component is an active hydrogen-containing vinyl monomer.

5. The ungelled polymeric reaction product of claim 4 wherein the active hydrogen-containing vinyl monomer is 2-hydroxyethyl methacrylate.

6. The ungelled polymeric reaction product of claim 5 wherein the active hydrogen-containing polymer is a polyester polyol having a hydroxyl number within the range of 80 to 350.

7. The ungelled polymeric reaction product of claim 1 wherein there is additionally present during the vinyl addition polymerization a solvent having a boiling point of at least 150° C.

8. The ungelled polymeric reaction product of claim 7 wherein the solvent is benzyl alcohol.

9. The ungelled polymeric reaction product of claim 1 wherein the vinyl addition polymerization is conducted at a temperature within the range of 150° C. to 250° C.

10. The ungelled polymeric reaction product of claim 9 wherein the vinyl addition polymerization is conducted at a temperature within the range of 170° C. to 210° C.

11. The ungelled polymeric reaction product of claim 1 wherein the vinyl addition polymerization free radical initiator is selected from peroxides and hydroperoxides.

12. The ungelled polymeric reaction product of claim 11 wherein the peroxide type initiator is present in an amount ranging from 0.10 percent to 10 percent.

13. A process which comprises the vinyl addition polymerization of a vinyl monomer component of which at least 30 percent by weight is an active hydrogen-containing vinyl monomer, in the presence of an active hydrogen-containing polymer having a number average molecular weight of less than 3000.

14. The process of claim 13 wherein at least 75 percent by weight of the vinyl monomer component is an active hydrogen-containing vinyl monomer.

15. The process of claim 14 wherein the active hydrogen-containing vinyl monomer is 2-hydroxyethyl methacrylate.

16. The process of claim 13 wherein the active hydrogen-containing polymer is a polyester polyol having a hydroxyl number within the range of 80 to 350.

17. The process of claim 13 wherein there is additionally present during the vinyl addition polymerization a solvent having a boiling point of at least 150° C.

18. The process of claim 17 wherein the solvent is benzyl alcohol.

19. The process of claim 13 wherein the vinyl addition polymerization is conducted at a temperature within the range of 150° C. to 250° C.

20. The process of claim 19 wherein the vinyl addition polymerization is conducted at a temperature within the range of 170° C. to 210° C.

21. The process of claim 13 wherein the vinyl addition polymerization free radical initiator is selected from peroxides and hydroperoxides.

22. The process of claim 21 wherein the peroxide type initiator is present in an amount ranging from 0.10 percent to 10 percent.

23. A coating composition comprising an ungelled polymeric reaction product having a number average molecular weight of up to about 3000 and having a polydispersity of within 1.2 to 2.5 prepared by a process, comprising the vinyl addition polymerization of a vinyl monomer component of which at least 30 percent by weight is an active hydrogen-containing vinyl monomer, in the presence of an active hydrogen-containing polymer having a number average molecular weight of less than 3000 and a curing agent adapted to cure said ungelled polymeric reaction product.

* * * * *